United States Patent Office 3,681,234
Patented Aug. 1, 1972

3,681,234
PRODUCTION OF AROMATICS FROM OLEFINIC HYDROCARBONS
Edward A. Fraini and Milton S. Wing, Lake Jackson, Tex., assignors to The Dow Chemical Company, Midland, Mich.
No Drawing. Filed Feb. 12, 1971, Ser. No. 115,104
Int. Cl. C10g 35/08
U.S. Cl. 208—141     6 Claims

ABSTRACT OF THE DISCLOSURE

A mixture of olefinic hydrocarbons having 3–5 carbons is reformed into a mixture of aromatic hydrocarbons having 6–10 carbon by contacting the olefinic mixture with a platinum catalyst in the presence of excess hydrogen. The contact temperature ranges from 550° C. to 625° C. with a pressure range from 450–550 p.s.i.g. The catalyst comprises 0.3 to 0.9 weight percent platinum on an alumina or silica support.

BACKGROUND OF THE INVENTION

This invention relates to the catalytic reforming of a mixture of olefinic hydrocarbons having 3–5 carbons into a mixture of aromatic hydrocarbons having 6–10 carbons.

It is known from U.S. Pat. 2,972,644 that paraffinic feedstocks of at least 5 carbons, more commonly a 5 carbon chain carrying at least one methyl substituent, can be dehydrocyclized over a catalyst into an aromatic mixture.

It is also known from U.S. Pat. 2,941,016 that olefinic feedstocks having 9–16 carbons can be aromatized into an aromatic mixture. However, considerable care is taken commercially to remove olefins of $C_5$ and less from reformer feeds.

The prior art thus never solved the problem of converting relatively short chain olefinic hydrocarbon feedstocks into aromatic-hydrocarbon mixtures.

SUMMARY OF THE INVENTION

It now has been surprisingly discovered that olefinic mixtures containing 3–5 carbons can be catalytically converted into an aromatic mixture having 6–10 carbons under the proper reaction conditions set forth below.

Generally, the invention comprises a process for reforming a mixture of olefinic hydrocarbons having 3–5 carbons into a mixture of aromatic hydrocarbons having 6–10 carbons wherein the olefinic mixture is contacted with a platinum catalyst in the presence of excess hydrogen where the temperature is in the range from 550°–625° C. and the pressure is in the range from 450–550 p.s.i.g. (pounds per square inch gage).

More specifically, the invention comprises the steps of (1) mixing hydrogen with the olefinic hydrocarbon mixture so that the molar ratio of hydrogen to hydrocarbon is in the range from 1.0 to 3.0.
(2) heating the hydrocarbon-hydrogen mixture to a temperature in the range from about 400° to about 525° C.,
(3) passing the hydrocarbon-hydrogen mixture through a reaction zone containing catalyst bed at a rate of about 1.0 to about 5.0 volumes of the hydrocarbon per volume of catalyst per hour wherein the temperature is maintained in the range from 550°–625° C. and the pressure is in the range 450–550 p.s.i.g. and wherein said catalyst comprises 0.3 to 0.9 weight percent platinum on an alumina or silica support and
(4) recovering the desired aromatic mixture.

The invention is useful to reform and upgrade normally useless feedstocks such as the $C_5$ bottoms from a propane cracking plant into a useful aromatic mixture which can be further separated into benzene, toluene, and the like fractions if desired.

DETAILED DESCRIPTION

The process of the invention uses commercially available platinum catalysts such as those containing 0.3–0.9 weight percent platinum on a pelletized alumina or silica support.

A preferred range of platinum in the catalyst support is 0.5–0.7 weight percent.

The feedstock or mixture of olefinic hydrocarbons which are treated or reformed in this process are readily available as residues from the cracking of propane, ethane, butane, isobutane, pentane fractions, and the like.

Hydrogen gas is mixed with the above olefinic in a conventional mixer at a rate in the range of 1.0–3.0 mole per mole of unsaturation and the mixture is swept into a preheater where the hydrocarbons are vaporized to raise the temperature thereof to a range from about 400° to about 525° C. and then it is pumped into a pressurized reactor containing a fixed bed of catalyst particles. The preferred rate of hydrogen mixing is in the range 1.5–2.5 mole per mole of unsaturation.

The reactor is maintained at a temperature of 550–625° C. during the reaction. A preferred temperature range is 590 to 610° C.

The exotherm is controlled in a conventional manner such as by using a catalyst bed of increasing concentration (catalyst dilution), product recycling or quenching, interstage heat transfer, and the like.

A pressure in the range from 450–550 p.s.i.g. is maintained in the reactor during the reaction. The preferred pressure range is from 475 to 525 p.s.i.g.

The hydrogen-olefin mixture is passed through the reactor at a rate in the range from about 1.0 to about 5.0 volumes of hydrocarbon per volume of catalyst per hour while the preferred rate is from about 1.5 to about 2.5.

It is essential to maintain the operating conditions within the above ranges since when the process is operated outside the above ranges, decreased conversions are obtained and resin oils are produced. The use of an excess amount of hydrogen, i.e. 3 moles/mole of hydrocarbon will cause undesired total saturation.

The invention is further illustrated by the following examples.

Examples 1–5

Into a reactor having a striated fixed bed of 0.6% platinum supported on alumina extrudates of $\frac{1}{16}''$ diameter and about $\frac{1}{4}''$ long having a varying concentration of catalyst in each layer with increasing concentration in a downward direction, a mixture of hydrogen and an olefinic feedstock containing 61% diolefins and 39% monoolefins having a carbon range of 3–5 carbons and comprising isoprene, 1,4-pentadiene, 1,3-butadiene, and the like, was passed at a feed rate of 1.7 liquid hourly space velocity (L.H.S.V.). The mixture contained hydrogen in a mole ratio of 1.2 hydrogen to unsaturation in the feed.

The catalyst bed had an average temperature of 570° C. and the pressure was 500 p.s.i.g.

A total liquid yield of 79.0 weight percent based on the feed was obtained which represents a productivity of 17.5 pounds of mixed aromatics per 100 pounds of olefin feed.

By varying the reaction conditions, the following data was obtained.

TABLE I

| | Hydrogen, mole ratio | Temp., °C. | Pressure, p.s.i.g. | L.H.S.V. | Pounds of aromatics/ 100 lbs. of feed |
|---|---|---|---|---|---|
| Control: | | | | | |
| 1 | 2.7 | 650 | 500 | 1 | 1.0 |
| 2 | 1.0 | 500 | 450 | 1 | 1.6 |
| Example: | | | | | |
| 2 | 2.2 | 600 | 500 | 1.7 | 19.5 |
| 3 | 2.3 | 600 | 500 | 2.3 | 17.5 |
| 4 | 1.5 | 600 | 500 | 2.5 | 17.5 |
| 5 | 1.7 | 600 | 475 | 3.3 | 7.5 |

We claim:

1. A process for the reforming of a mixture of olefinic hydrocarbons having 3–5 carbons into a mixture of aromatic hydrocarbons having 6–10 carbons comprising contacting said mixture of olefinic hydrocarbons in the presence of excess hydrogen with a platinum catalyst comprising 0.3 to 0.9 weight percent platinum on an alumina or silica support wherein the contact temperature is in the range from 550°–625° C., the pressure in the contact zone is in the range from 450–550 p.s.i.g.

2. The process as set forth in claim 1 in which hydrogen is supplied to the reaction at a rate in the range of 1.0–3.0 mole per mole of unsaturation in said olefinic hydrocarbons.

3. The process as set forth in claim 1 in which the olefinic hydrocarbon mixture is contacted with the catalyst at a rate of about 1.0–5.0 cubic centimeter hydrocarbon per cubic centimeter of catalyst per hour.

4. A process for the reforming of a mixture of olefinic hydrocarbons having 3–5 carbons into a mixture of aromatic hydrocarbons having 6–10 carbons comprising the steps of (a) mixing hydrogen with the olefinc hydrocarbon mixture so that the molar ratio of hydrogen to hydrocarbon is in the range from 1.0 to 2.5, (b) heating the hydrocarbon-hydrogen mixture to a temperature in the range from about 400° to about 525° C., (c) passing the hydrocarbon-hydrogen mixture through a reaction zone containing a catalyst bed at a rate of about 1.0 to about 5.0 volume of said mixture per volume of catalyst per hour wherein the temperature is maintained in the range from 550°–625° C. and the pressure is maintained in the range 450–550 p.s.i.g. and wherein said catalyst comprises 0.3 to 0.9 weight percent platinum on an alumina or silica support and, (d) recovering the desired aromatic hydrocarbons.

5. A process is set forth in claim 4 in which the temperature of the zone is maintained in the range from 590 to 610° C. and the pressure is maintained in the range from 475 to 525 p.s.i.g.

6. A process as set forth in claim 5 in which the catalyst concentration is in the range from 0.5–0.7 weight percent.

References Cited
UNITED STATES PATENTS

| | | | |
|---|---|---|---|
| 2,230,461 | 2/1941 | Komarewsky | 260—673 |
| 2,404,628 | 7/1946 | Grenko et al. | 260—673 |
| 2,431,549 | 11/1947 | Frey | 260—673 |
| 2,972,644 | 2/1961 | Holmes et al. | 260—673.5 |
| 2,992,283 | 7/1961 | Eng | 260—673 |
| 3,434,961 | 3/1969 | Eng et al. | 208—141 |

HERBERT LEVINE, Primary Examiner

U.S. Cl. X.R.

208—138; 260—673